(12) United States Patent  
Singh et al.

(10) Patent No.: US 11,741,275 B2  
(45) Date of Patent: Aug. 29, 2023

(54) MODEL-BASED SELECTION OF DISSOLVABLE SEALING BALLS

(71) Applicant: Halliburton Energy Services, Inc., Houston, TX (US)

(72) Inventors: John Paul Bir Singh, Kingwood, TX (US); Siva Rama Krishna Jandhyala, Katy, TX (US); Michelle Kan, Houston, TX (US); Ernst Rudolf Man Schnell, Houston, TX (US); Travis Allen Patterson, Houston, TX (US); Megan McDaniel, Natchitoches, LA (US); K V V N Krishna Babu Yerubandi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 56 days.

(21) Appl. No.: 17/508,331

(22) Filed: Oct. 22, 2021

(65) Prior Publication Data

US 2023/0128448 A1    Apr. 27, 2023

(51) Int. Cl.
  *G06F 30/20*   (2020.01)
  *E21B 33/12*   (2006.01)
  *E21B 49/08*   (2006.01)
  *E21B 47/07*   (2012.01)
  *G06F 119/14*   (2020.01)

(52) U.S. Cl.
  CPC .............. *G06F 30/20* (2020.01); *E21B 33/12* (2013.01); *E21B 47/07* (2020.05); *E21B 49/0875* (2020.05); *E21B 2200/08* (2020.05); *G06F 2119/14* (2020.01)

(58) Field of Classification Search
  CPC .. E21B 43/16; E21B 43/295; G01N 33/54366
  See application file for complete search history.

(56) References Cited

U.S. PATENT DOCUMENTS

| | | | |
|---|---|---|---|
| 9,932,796 | B2 | 4/2018 | Walton et al. |
| 10,961,815 | B2 | 3/2021 | Garcia et al. |
| 2014/0116721 | A1 | 5/2014 | Hofman et al. |
| 2017/0247996 | A1 | 8/2017 | Hardesty |
| 2018/0128082 | A1 | 5/2018 | Hollan et al. |
| 2018/0265682 | A1 | 9/2018 | Roy et al. |
| 2020/0095840 | A1 | 3/2020 | Gill et al. |

FOREIGN PATENT DOCUMENTS

WO    2018035149    2/2018

OTHER PUBLICATIONS

International Search Report and Written Opinion dated Jan. 4, 2023, issued in corresponding PCT Application No. PCT/US2022/043819.

*Primary Examiner* — Zakiya W Bates  
(74) *Attorney, Agent, or Firm* — McAfee & Taft (57) ABSTRACT

A system and method including modeling wellbore conditions and plug properties to predetermine the dissolution time of a plug under wellbore conditions for use in a well operation. The system and method provide an estimate of how long a dissolvable plug will remain viable based on its composition and the conditions in the wellbore. Once a plug has been selected or once wellbore conditions have been determined, the plug and/or conditions can be tested in the lab to confirm suitability prior to use downhole.

20 Claims, 8 Drawing Sheets

MODEL-BASED SELECTION OF DISSOLVABLE SEALING BALLS

FIELD

The present disclosure relates generally to the field of model-building for selection of down-hole well components, and more specifically, to the analysis of properties for the selection of plugs and/or balls and/or well conditions useful in well operations, such as wet shoe tool operations.

BACKGROUND

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid. To secure the wellbore against collapse and undesired inflow and outflow of fluids, well components are installed to form barrier envelopes with redundancy. These barriers are generally pressure tested for commissioning.

It is desirable to perform treatment operations within a wellbore. A variety of tools can be used to perform such well operations. For example, tools can be used to perform cementing, fracturing, stimulation, injection, and production operations. It is not uncommon for these tools or plugs to temporarily stop the flow of fluids through the tool or to redirect the flow of fluids through the tool.

A conventional barrier envelope that relies on cement inside and around the casing shoe is not an effective option to pressure test against, as it will require an expensive drill out operation. Instead, operators may use a "wet shoe" at the end of casing, liner or other tubing where cement does not set around or obstruct a float valve (e.g. a check valve) at the end of the tubular string and does not isolate the "shoe track" at the end of the tubular string. After cementing, fluid flow remains possible through the tubing and float valve into the wellbore. In this way, the wet shoe enables operators to conduct subsequent operations after cementing, such as pumping down plugs or perforating guns to the toe of the well.

When completing the cement job without placing cement in the shoe track, however, performing a full pressure test on the tubular barrier envelope is not feasible after the wiper plug has landed. For this reason, a full pressure test may not be performed in some implementations. As will be appreciated, however, being able to check the integrity of the barrier envelope with a pressure test is preferred. For example, fracturing-candidate wells require a sealed barrier envelope that can be pressure tested. More specifically, fracturing-candidate wells require not only a pressure test, but also a conduit for injecting fluids through the bottom of the open hole (e.g. wet shoe) to allow the pumping down of frac balls or other devices during the fracturing stages.

Instead, the "wet shoe" and some other applications and systems utilize a dissolvable ball or plug paired with a "seat" or other sealing surface to temporarily seal the barrier envelope to be pressure tested. However, such a plug needs to have a dissolution rate that meets the needs of the operator and conditions of the wellbore environment. Currently, methods of selecting a dissolvable ball or plug can be expensive and very subjective. There is a need for a more efficient, quantitative process for designing the operations and selecting the suitable plug for a choice of downhole conditions.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

The present disclosure may be understood more readily by reference to this detailed description, including the figures. For simplicity and clarity of illustration, where appropriate, reference numerals may be repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may have been exaggerated to better illustrate details and features of the present disclosure.

Definitions: As used herein the following terms have the indicated meaning.

A well can include, without limitation, an oil, gas, or water production well, or an injection well. As used herein, a "well" includes at least one wellbore. A wellbore can include vertical, inclined, and horizontal sections, and it can be straight, curved, or branched. As used herein, the term "wellbore" includes any cased, and any uncased, open-hole section of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any section of the well, including into the wellbore or into the near-wellbore region via the wellbore.

A portion of a wellbore may be an open hole or cased hole. In an open-hole wellbore section, a tubing string may be placed into the wellbore. The tubing string allows fluids to be introduced into or flowed from a remote section of the reservoir. In a cased-hole wellbore section, a casing is placed into the wellbore that can also contain a tubing string. A wellbore can contain an annulus. Examples of an annulus include but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

As used herein, the term "stress-deformation" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's stress-deformation or distortion can include, without limitation, changes in the body's length (e.g., linear strain), volume (e.g., bulk strain) and/or a lateral displacement between two substantially parallel planes of material within the body (e.g., shear strain).

The term "dissolvable plug" refers to a plug, whether a ball plug or other geometric configuration, made of metal or polymer that can dissolve quickly via thermal decomposition and/or corrosion in water, as well as other similar controllable wellbore conditions. For example, it has been discovered that a plug made of one or more metals or metal alloys can dissolve via corrosion (as discussed below for "corrosion"). For example, certain polymers can undergo thermal decomposition. For example, polyglycolic acid (PGA) shows high degradability in the presence of water because of the large number of hydrolysable ester groups per unit volume. The degradation of PGA is by hydrolysis; therefore, the temperature and presence of water are the essential factors governing the degradation.

The rate of decomposition (whether thermal, corrosion, or other) can be adjusted by the plug composition of the plug to provide the desired dissolving time of the plug. As used herein, "dissolving", "decomposition" and the like will refer to the degradation of the plug whether by corrosion, thermal decomposition, or other means.

As used herein, the term "corrosion" means the dissolution of a polymer, metal or metal alloy by a chemical reaction with the environment. For example, known metal alloys—such as magnesium alloys—will dissolve via corrosive action in water and/or water containing one or more dissolved salts. Further, galvanic corrosion occurs when two different metals or metal alloys are in electrical connectivity with each other and both are in contact with an electrolyte. As used herein, the phrase "electrical connectivity" means that the two different metals or metal alloys are either touching or in close enough proximity to each other such that when the two different metals are in contact with an electrolyte, the electrolyte becomes electrically conductive and ion migration occurs between one of the metals and the other metal, and is not meant to require an actual physical connection between the two different metals, for example, via a metal wire. Galvanic corrosion can also occur in certain metal alloys when in the presence of an electrolyte without a distinct cathode being present. As used herein, the term "galvanic corrosion" also includes "micro-galvanic corrosion," where the anode and cathode are part of the metal alloy. The term galvanic corrosion is also intended to cover applications where there are distinct regions of anodic and cathodic materials within the metal.

It is to be understood that as used herein, the term "metal" is meant to include pure metals and metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

The metal that is less noble, compared to the other metal, will dissolve in the electrolyte. The less noble metal is often referred to as the anode, and the more noble metal is often referred to as the cathode. Galvanic corrosion is an electrochemical process whereby free ions in the electrolyte make the electrolyte electrically conductive, thereby providing a means for ion migration from the anode to the cathode—resulting in deposition formed on the cathode. Metals can be arranged in a galvanic series. The galvanic series lists metals in order of the most noble to the least noble. An anodic index lists the electrochemical voltage (V) that develops between a metal and a standard reference electrode (gold (Au)) in a given electrolyte. The actual electrolyte used can affect where a particular metal or metal alloy appears on the galvanic series and can also affect the electrochemical voltage. For example, the dissolved oxygen content in the electrolyte can dictate where the metal or metal alloy appears on the galvanic series and the metal's electrochemical voltage. The anodic index of gold is −0 V; while the anodic index of beryllium is −1.85 V. A metal that has an anodic index greater than another metal is more noble than the other metal and will function as the cathode. Conversely, the metal that has an anodic index less than another metal is less noble and functions as the anode. In order to determine the relative voltage between two different metals, the anodic index of the lesser noble metal is subtracted from the other metal's anodic index, resulting in a positive value.

There are several factors that can affect the rate of galvanic corrosion. One of the factors is the distance separating the metals on the galvanic series chart or the difference between the anodic indices of the metals. For example, beryllium is one of the last metals listed at the least noble end of the galvanic series and platinum is one of the first metals listed at the most noble end of the series. By contrast, tin is listed directly above lead on the galvanic series. Using the anodic index of metals, the difference between the anodic index of gold and beryllium is 1.85 V; whereas, the difference between tin and lead is 0.05 V. This means that galvanic corrosion will occur at a much faster rate for magnesium or beryllium and gold compared to lead and tin.

The following is a partial galvanic series chart using a deoxygenated sodium chloride water solution as the electrolyte. The metals are listed in descending order from the most noble (cathodic) to the least noble (anodic). The following list is not exhaustive, and one of ordinary skill in the art is able to find where a specific metal or metal alloy is listed on a galvanic series in a given electrolyte.

PLATINUM
GOLD
ZIRCONIUM
GRAPHITE
SILVER
CHROME IRON
SILVER SOLDER
COPPER-NICKEL ALLOY 80-20
COPPER-NICKEL ALLOY 90-10
MANGANESE BRONZE (CA 675), TIN BRONZE (CA903, 905)
COPPER (CA102)
BRASSES
NICKEL (ACTIVE)
TIN
LEAD
ALUMINUM BRONZE
STAINLESS STEEL
CHROME IRON
MILD STEEL (1018), WROUGHT IRON
ALUMINUM 2117, 2017, 2024
CADMIUM
ALUMINUM 5052, 3004, 3003, 1100, 6053
ZINC
MAGNESIUM
BERYLLIUM

The following is a partial anodic index listing the voltage of a listed metal against a standard reference electrode (gold) using a deoxygenated sodium chloride water solution as the electrolyte. The metals are listed in descending order from the greatest voltage (most cathodic) to the least voltage (most anodic). The following list is not exhaustive, and one of ordinary skill in the art is able to find the anodic index of a specific metal or metal alloy in a given electrolyte.

Anodic Index

| Metal | Index (V) |
| --- | --- |
| Gold, solid and plated, Gold-platinum alloy | −0.00 |
| Rhodium plated on silver-plated copper | −0.05 |
| Silver, solid or plated; monel metal. High nickel-copper alloys | −0.15 |
| Nickel, solid or plated, titanium alloys, Monel | −0.30 |
| Copper, solid or plated; low brasses or bronzes; silver solder; German silvery high copper-nickel alloys; nickel-chromium alloys | −0.35 |
| Brass and bronzes | −0.40 |
| High brasses and bronzes | −0.45 |
| 18% chromium type corrosion-resistant steels | −0.50 |
| Chromium plated; tin plated; 12% chromium type corrosion-resistant steels | −0.60 |
| Tin-plate; tin-lead solder | −0.65 |
| Lead, solid or plated; high lead alloys | −0.70 |
| 2000 series wrought aluminum | −0.75 |
| Iron, wrought, gray or malleable, plain carbon and low alloy steels | −0.85 |
| Aluminum, wrought alloys other than 2000 series aluminum, cast alloys of the silicon type | −0.90 |
| Aluminum, cast alloys other than silicon type, cadmium, plated and chromate | −0.95 |
| Hot-dip-zinc plate; galvanized steel | −1.20 |
| Zinc, wrought; zinc-base die-casting alloys; zinc plated | −1.25 |
| Magnesium & magnesium-base alloys, cast or wrought | −1.75 |
| Beryllium | −1.85 |

Another factor that can affect the rate of galvanic corrosion is the temperature and concentration of the electrolyte. The higher the temperature and concentration of the electrolyte, generally the faster the rate of corrosion. Yet another factor that can affect the rate of galvanic corrosion is the total amount of surface area of the least noble (anodic metal). The greater the surface area of the anode that can come in contact with the electrolyte, the faster the rate of corrosion. The cross-sectional size of the anodic metal pieces can be decreased in order to increase the total amount of surface area per total volume of the material. The anodic metal or metal alloy can also be a matrix in which pieces of cathode material is embedded in the anode matrix. Yet another factor that can affect the rate of galvanic corrosion is the ambient pressure. Depending on the electrolyte chemistry and the two metals, the corrosion rate can be slower at higher pressures than at lower pressures if gaseous components are generated.

Turning now to the methods and systems of this disclosure, dissolvable plugs are applicable to a variety of downhole operations. For example, wet-shoe operations often utilize dissolvable plugs.

Wet-shoe operations, for example, can be used in fracturing. Fracturing candidate wells require not only a sealed casing envelope that can be pressure tested, but also a conduit for injecting fluids through the bottom of the open hole (e.g. wet shoe) to allow the pumping down of plugs (frac balls) or other devices during the fracturing stages. Therefore, the conventional barrier envelope that relies on cement inside and around the casing shoe is not an effective option to pressure test against, as it will require an expensive drill out operation. Another currently practiced alternative are "toe sleeves", diverting tools that open a flow path to the open hole mechanically, but which involve additional handling, failure risk and cost.

The wet shoe operation with IsoLatch™ system (available from Halliburton Energy Services) with testable sub uses a dissolvable ball with a requisite dissolution rate. The dissolution rate needs to balance the need for capability to seal against the ball seat for pressure testing with the waiting time required until the flow path can be re-established by pumping the dissolved ball through the seat.

The conventional process of selecting a ball type and size is based on experience and lab testing with the ball and seat arrangement. The testing could be expensive and experience very subjective. There is a need for a more efficient, quantitative process for designing the operations and selecting the suitable ball (or plug) for a choice of downhole conditions like temperature, pressure, salt concentration, etc.

The current processes and systems provide for designing the operation and/or selecting a suitable plug, wherein the plug can seal with a plug seat to prevent fluid flow and to maintain a specified pressure differential prior to dissolving. The systems and processes allow the selection of design operations and/or plug so that the plug dissolves in a desired amount of time to re-establish fluid flow and remove the pressure differential.

Figure 1:
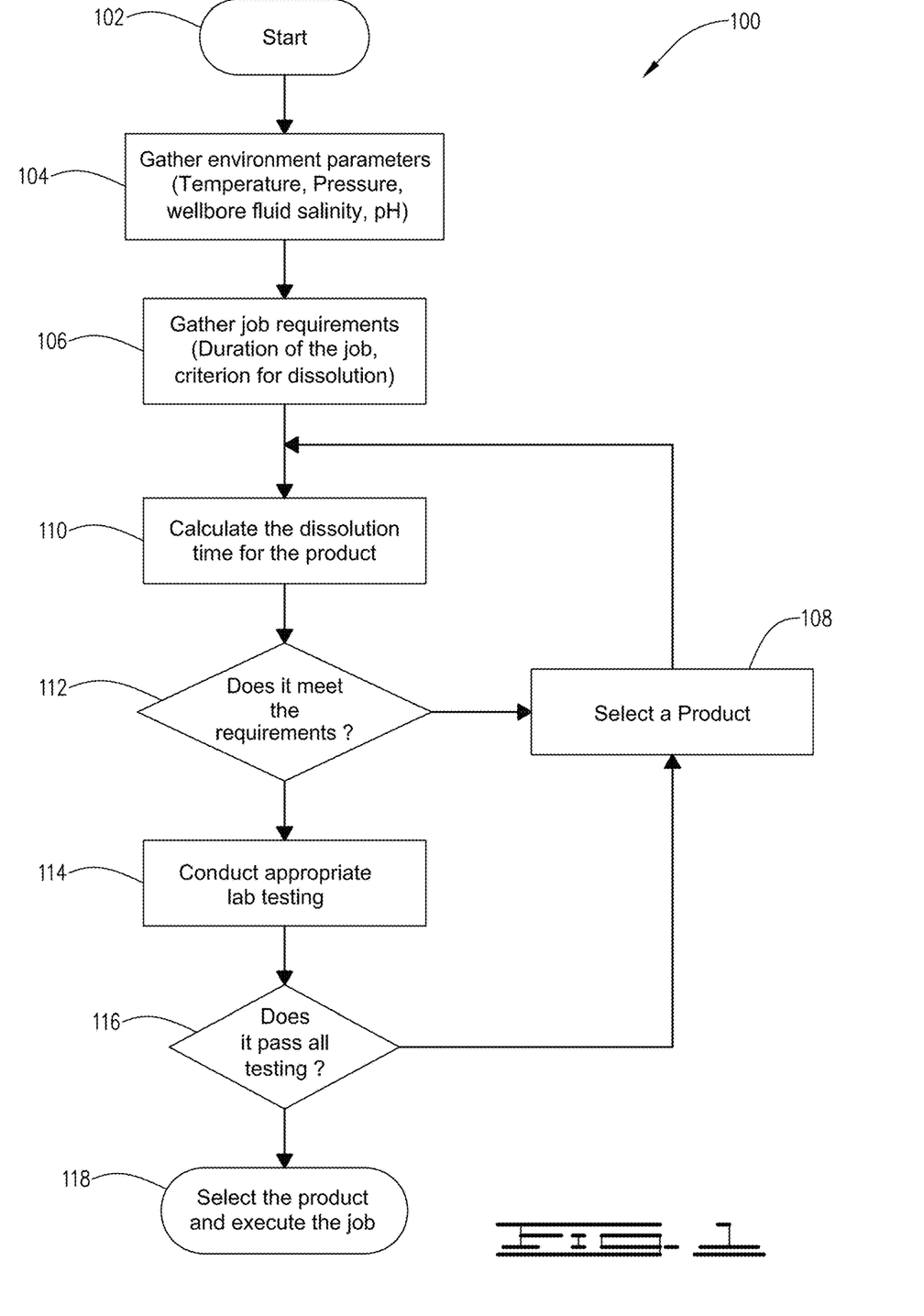
FIG. 1 is a flow diagram illustrating an embodiment of a method in accordance with this disclosure.

FIG. 1 presents a flow diagram illustrating a method 100 of selecting a well plug according with some embodiments of this disclosure. Method 100 selects the appropriate well plug based on wellbore conditions at a location in a wellbore. The plug is selected to meet dissolution requirements for a well operation. Generally, the plug is selected from multiple options of plugs that each have a different composition and thus will dissolve at different rates under the wellbore conditions.

After the method is started at step 102, a set of wellbore conditions are defined in step 104 ("Gather environment parameters"). Typically, the set of wellbore conditions include one or more of physical properties of a plug seat located within the wellbore and the temperature, pressure, pH of wellbore fluid, and salinity of wellbore fluid at the wellbore location. The salinity can include amount and kind of salt present. More typically, the set of wellbore conditions include all the following: physical properties of a plug seat, temperature, pressure, pH of wellbore fluid, and salinity of wellbore fluid at the wellbore location. Further, in some of the embodiments, the set of wellbore conditions account for variations in the wellbore conditions over a period of time when the proposed plug is at the wellbore location. For example, expected changes in temperature or pressure, or changes in salinity during the wellbore operation.

In step 106 ("Gather job requirements"), the method gathers the wellbore-operation requirements, which can include the duration of the job (wellbore operation) and criterion for dissolution. For example, the wellbore-operation requirements are used to determine how long the plug needs to maintain contact with the plug seat so as to prevent fluid flow and/or maintain a pressure differential. Additionally, the wellbore-operation requirements are used to determine the time period before the plug should have dissolved enough to pass through the plug seat.

Next, in accordance with step 108, a proposed plug is selected from the available choices of dissolvable plugs. As part of this step, the plug properties are entered or defined. The plug properties are based on the physical properties and composition properties of a proposed plug. For example, the physical properties can include the geometric shape of the proposed plug (spherical or ball, conical, etc.). The composition properties can include, for example, data on the galvanic corrosion rate of a metal or metal alloy plug, or the thermal decomposition rate for a polymer plug.

Next in step 110, the dissolution properties for the proposed plug are determined by creating an analysis of a physical and chemical model generated from the set of wellbore conditions and plug properties. The dissolution properties can include the seal time for which the proposed plug can maintain a seal with the plug seat to hold pressure and/or the dissolution time until the plug is dissolved sufficiently to pass through the plug seat. Further the physical and chemical model can include stress-deformation data for the proposed plug, which might affect its ability to maintain a seal with the plug seat and or to pass through the plug seat due to deformation.

After step 110, the user or operator can be provided with the results such as the total time the proposed plug will provide a viable seal with the plug seat, and/or the total time the proposed plug will have dissolved sufficiently to allow a downhole operation to start or continue. The method can end with the result provided, or additional proposed plugs can be analyzed by the method to obtain results on their dissolution in the wellbore environment.

Optionally after step 110, the method determines whether the dissolution properties meet the needs of a wellbore-operation requirements in step 114. If not, a new proposed plug with different plug properties from the previous plug is selected in step 108, and steps 110 and 112 are repeated for the new proposed plug. The steps are repeated for additional plugs until a plug is selected that meets the well-operation requirements or until it is determined that none of the available plugs will meet the well-operation requirements under the set of wellbore conditions. Typically, this means that the process is repeated, for differing plug properties of one or more additional proposed plugs, until at least one proposed plug is determined to have a dissolution time that meets the needs of the wellbore operation under the conditions of the set of wellbore conditions.

A plug meeting the plug properties (physical and composition properties) of the selected plug can next be used in the wellbore in the wellbore operation (step 118); however, in embodiments, the plug can be tested in the laboratory to confirm the suitability of the plug for use in the wellbore operation (steps 114 and 116) prior to use in the wellbore operation.

Figure 2:
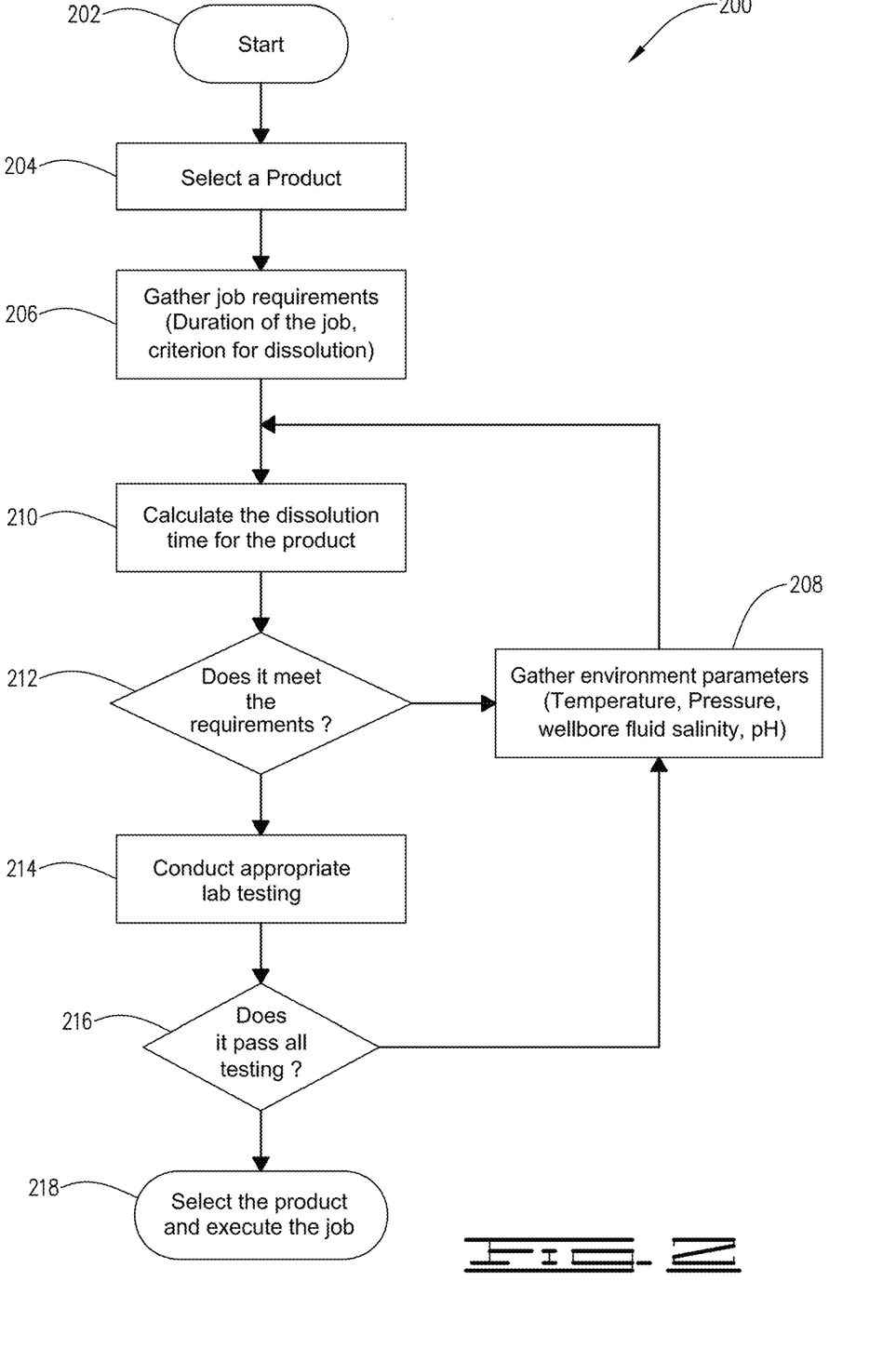
FIG. 2 is a flow diagram illustrating another embodiment of a method in accordance with this disclosure.

FIG. 2 presents a flow diagram illustrating a method 200 of selecting wellbore conditions to be used with a selected well plug according with some embodiments of this disclosure. Method 200 selects the wellbore conditions such that the selected well plug has dissolution properties to meet the wellbore-operation requirements.

After the method is started at step 202, a plug is selected for use in the wellbore operation in step 204. As part of this step, the properties of the selected plug are entered or defined. As above, the plug properties are based on the physical properties and composition properties of a proposed plug. For example, the physical properties can include the geometric shape of the proposed plug (spherical or ball, conical, etc.). The composition properties can include, for example, data on the galvanic corrosion rate of a metal or metal alloy plug, or the thermal decomposition rate for a polymer plug.

In step 206 ("Gathering job requirements"), the method gathers the wellbore-operation requirements as per step 106 of method 100.

Next, a proposed set of wellbore conditions are defined, or set, in step 208 ("Set environment parameters"). Typically, the set of wellbore conditions include one or more of physical properties of a plug seat located within the wellbore and the temperature, pressure, pH of wellbore fluid, and salinity of wellbore fluid at the wellbore location. The salinity can include amount and kind of salt present. More typically, the set of wellbore conditions include all the following: physical properties of a plug seat, temperature, pressure, pH of wellbore fluid, and salinity of wellbore fluid at the wellbore location. Further, in some of the embodiments, the set of wellbore conditions account for variations in the wellbore conditions over a period of time when the proposed plug is at the wellbore location. For example, expected changes in temperature or pressure, or changes in salinity during the wellbore operation.

Next in step 210, the dissolution properties for the proposed plug is determined by creating an analysis of a physical and chemical model generated from the set of wellbore conditions and plug properties as was done in step 110 of method 100.

After step 210, the method determines whether the dissolution properties meet the needs of a wellbore-operation requirements in step 212. If not, a new set of proposed wellbore conditions are defined or set in step 208, and steps 210 and 212 are repeated for the new set of proposed wellbore conditions. The new set of proposed wellbore conditions can change one or more of the conditions of the prior proposed conditions.

The steps are repeated for additional sets of wellbore conditions until the plug meets the well-operation requirements or until it's determined that the plug will not meet the well-operation requirements under any suitable conditions or acceptable conditions.

The plug and selected wellbore conditions can next be used in the wellbore in the wellbore operation (step 218); however, in embodiments, the selected wellbore conditions and the plug are tested in the laboratory to confirm the suitability for use in the wellbore operation (steps 214 and 216) prior to use in the wellbore operation.

While the embodiments above describe changing either proposed plug or the proposed set of wellbore conditions, the method can be carried out changing both the proposed plug and proposed set of wellbore conditions to arrive at selected wellbore conditions and a selected plug. Thus, the method can be used to model multiple plug and multiple wellbore conditions to select the best combination for use to meet the requirements of the wellbore operation.

Figure 3:
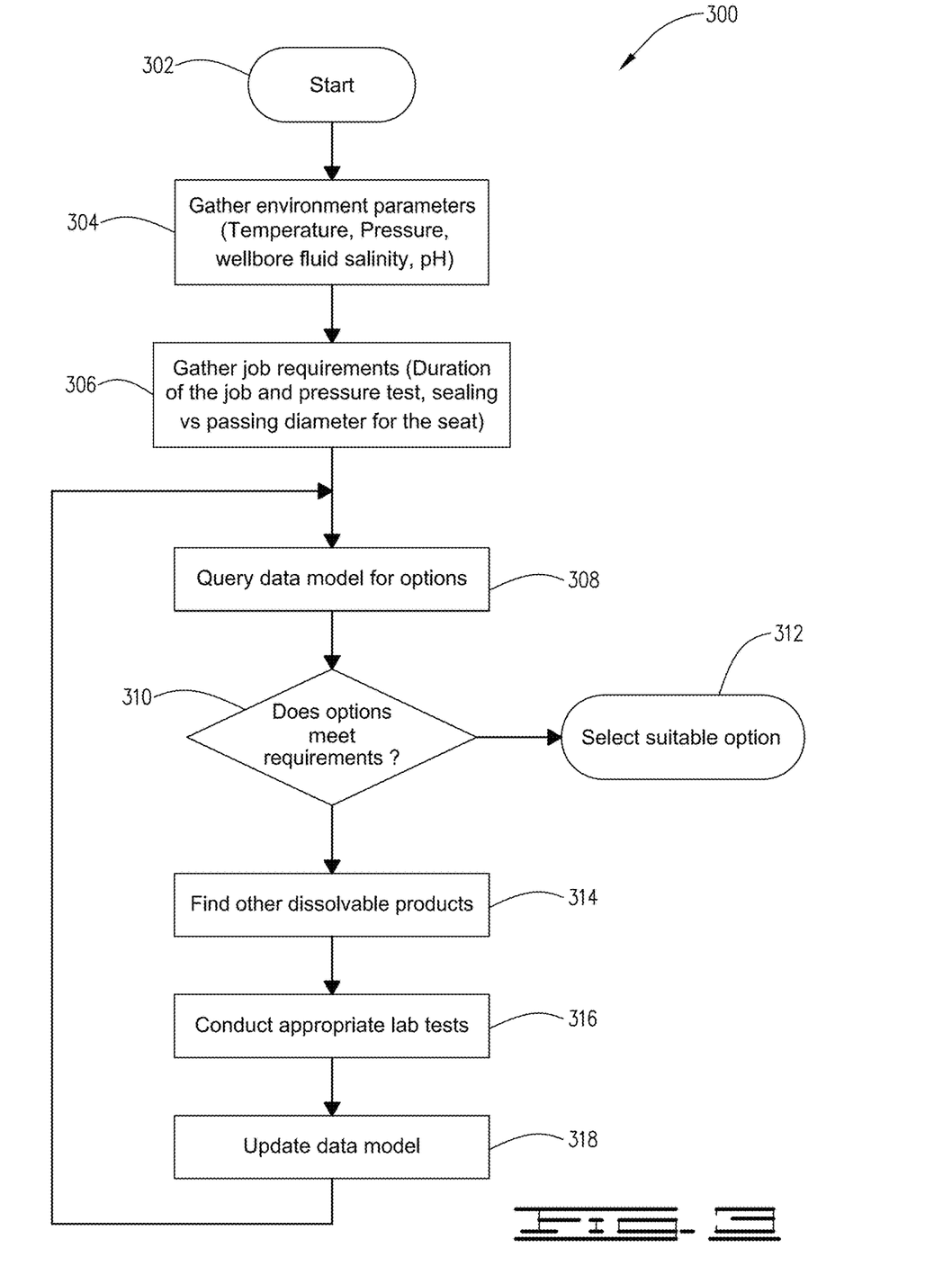
FIG. 3 is a flow diagram illustrating a third embodiment of a method in accordance with this disclosure.

FIG. 3 illustrates a third embodiment. The illustrated method 300 is for selecting plugs and for preparing and/or updating the computer based model utilized to select plugs or wellbore conditions.

After the method is started at step 302, a set of wellbore conditions are defined in step 304 ("Gather environment parameters"), which is the same as step 104 in FIG. 1. As was the case for FIG. 1, typically, the set of wellbore conditions include one or more of physical properties of a plug seat located within the wellbore and the temperature, pressure, pH of wellbore fluid, and salinity of wellbore fluid at the wellbore location.

In step 306 ("Gather job requirements"), the method gathers the wellbore-operation requirements, which can include the duration of the job and criterion for dissolution. For example, the wellbore-operation requirements are used to determine how long the plug needs to maintain contact with the plug seal so as to prevent fluid flow and/or maintain a pressure differential. Additionally, the wellbore-operation requirements are used to determine the time period before the plug should have dissolved enough to pass through the plug seal.

Next, in accordance with step 308, the model data of dissolvable plugs is queried for plugs that best meet the required dissolution requirements based on the wellbore conditions and/or the wellbore-operation requirements. The plugs considered are pre-evaluated plugs for which sufficient data is available to determine their performance under the wellbore conditions. As part of this step, the plug properties, such as dissolution rates under the conditions are considered. Such dissolution rates can include the total time that the plug can maintain a viable seal with the plug seat under the wellbore conditions, and/or the total time that the plug will take to dissolve sufficiently to allow the wellbore-operation to commence or to continue, if it has been halted.

Next in step 310, the method makes a determination of whether the wellbore-operation requirements will be sufficiently met by one or more of the pre-evaluated plug options. If one or more of the pre-evaluated plugs meet the wellbore-requirements, one of the plugs can be selected at step 312. If none of the plugs sufficiently meet the wellbore-operation requirements, then additional dissolvable plug(s) can be obtained (step 314) and evaluated in the laboratory test to determine the additional dissolvable plug's properties (step 316), including the dissolution rates under various wellbore conditions. The model can then be updated at step 318 with the data of the additional dissolvable plug(s). Then, the model can select the one or more of the additional plugs in step 308 and make a determination at step 310 of whether the current wellbore-operational requirements will be sufficiently met by the additional dissolvable plug(s). The steps for additional plugs can be repeated as necessary.

Similar to the other embodiments, the properties of the additional dissolvable plug(s) relate to the dissolution properties and are created from an analysis of a physical and chemical plug properties. The dissolution properties under various temperature, pH conditions, salinities, and temperatures can include estimates of the seal time for which the proposed plug can maintain a seal with the plug seat to hold pressure and/or the dissolution time until the plug is dissolved sufficiently to pass through the plug seat under various wellbore conditions. Further, the physical and chemical properties can include stress-deformation data for the proposed plug, which might affect its ability to maintain a seal with the plug seat and or to pass through the plug seat due to deformation.

After selection of a suitable plug option at step 312, the plug meeting the plug properties (physical and composition properties) of the selected plug can next be used in the wellbore in the wellbore operation; however, in embodiments, such a plug can be tested in the laboratory to confirm the suitability of the plug for use in the wellbore operation prior to use in the wellbore operation.

Figure 4:
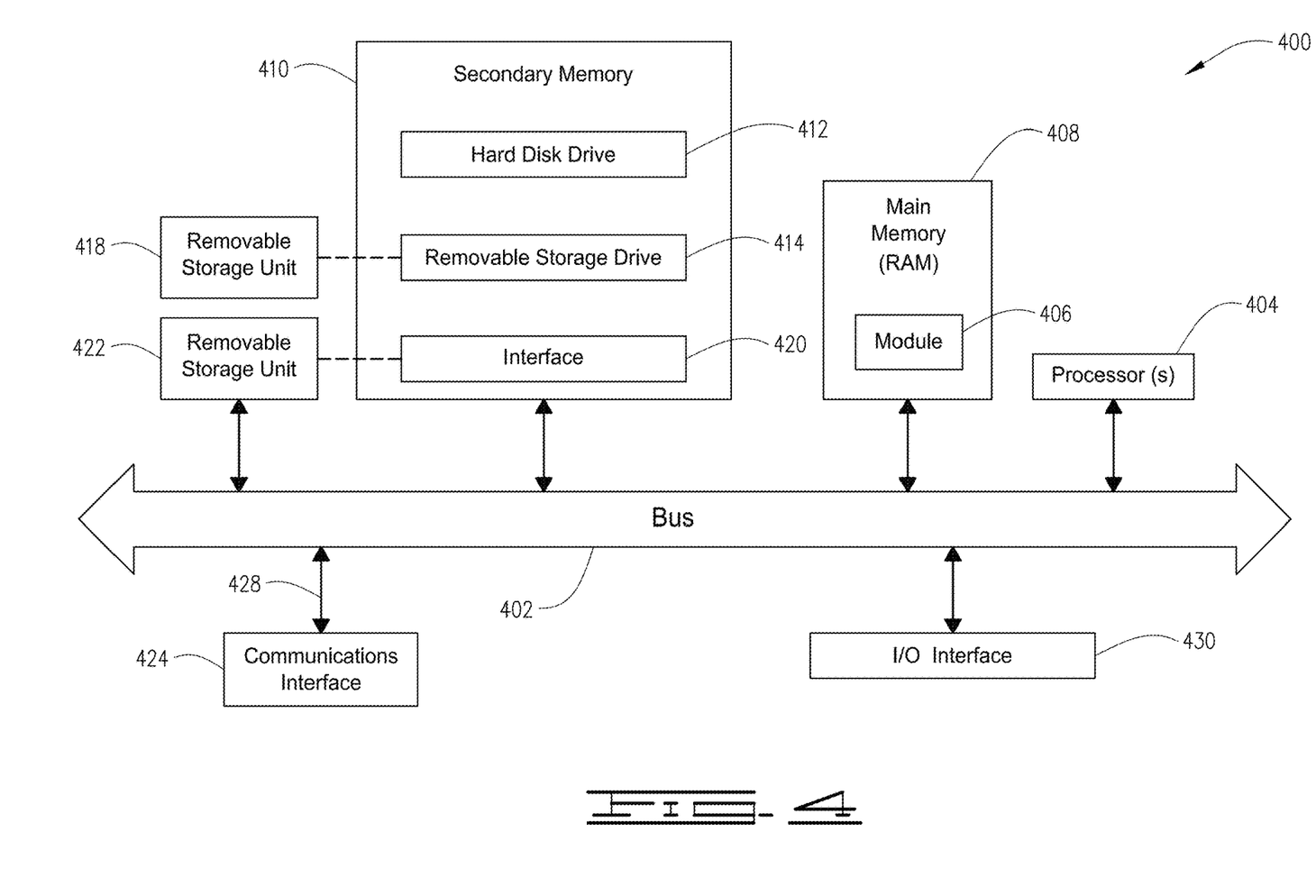
FIG. 4 schematically illustrates a computer system capable of carrying out the method of this disclosure.

The method of the present disclosure can be carried out on a system such as the one illustrated in FIG. 4, which illustrates a computer system 400 capable of carrying out the functionality described herein. While this exemplary computer system 400 is described, it will be apparent to a person skilled in the relevant art how to implement the method of the present disclosure using other computer systems and/or computer architectures.

The example computer system 400 includes one or more processors, such as processor 404. The processor 404 is connected to a computer system internal communication bus 402. Computer system 400 also includes a main memory 408, preferably random-access memory (RAM), and may also include a secondary memory 410. The secondary memory 410 may include, for example, one or more hard disk drives 412 and/or one or more removable storage drives 414, representing, floppy disk drive, a magnetic tape drive, an optical disk drive, etc. The removable storage drive 414 reads from and/or writes to a removable storage unit 418 in a well-known manner. Removable storage unit 418 represents a floppy disk, magnetic tape, optical disk, flash drive, etc., which is read by and written to the removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into the computer system 400. Such means may include, for example, a removable storage unit 422 and an interface 420. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 422 and interfaces 420 which allow software and data to be transferred from the removable storage unit 422 to computer system 400. In general, computer system 400 is controlled and coordinated by operating system (OS) software, which performs tasks such as process scheduling, memory management, networking and I/O services.

There may also be a communications interface 424 connecting to the bus 402. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical, or other signals capable of being received by communications interface 424. The computer system 400 communicates with other computing devices over a data network based on a special set of rules (i.e., a protocol). One of the common protocols is TCP/IP (Transmission Control Protocol/Internet Protocol) commonly used in the Internet. In general, the communications interface 424 manages the assembling of a data file into smaller packets that are transmitted over the data network or reassembles received packets into the original data file. In addition, the communications interface 424 handles the address part of each packet so that it gets to the right destination or intercepts packets destined for the computer system 400. In this disclosure, the terms "computer program medium" and "computer usable medium" are used to generally refer to media such as removable storage drive 414, and/or a hard disk installed in hard disk drive 412. These computer program products are means for providing software to computer system 400.

The computer system 400 may also include an input/output (I/O) interface 430, which provides the computer system 400 to access the monitor, keyboard, mouse, printer, scanner, plotter, and alike.

Computer programs (also called computer control logic) are stored as application modules 406 in main memory 408 and/or secondary memory 410. Computer programs may also be received via communications interface 424. Such computer programs, when executed, enable the computer system 400 to perform the features of the present disclosure as discussed herein. In particular, the computer programs, when executed, enable the processor 404 to perform features of the present disclosure. Accordingly, such computer programs represent controllers of the computer system 400.

In an embodiment where the method of the present disclosure is implemented using software, the software may be stored in a computer program product and loaded into computer system 400 using removable storage drive 414, hard disk drive 412, or communications interface 424. The application module 406, when executed by the processor 404, causes the processor 404 to perform the functions of the present disclosure as described herein.

The main memory 408 may be loaded with one or more application modules 406 that can be executed by one or more processors 404 with or without a user input through the I/O interface 430 to achieve desired tasks. In operation, when at least one processor 404 executes one of the application modules 406, the results are computed and stored in the secondary memory 410 (i.e., hard disk drive 412).

In accordance with the above, other embodiments of this disclosure are directed to a system for selecting well plugs and/or wellbore conditions. The system comprises a main memory and at least one processor. The main memory is configured to store computer readable code for an application module. Then at least one processor is coupled to the main memory, and is configured to execute the computer readable code in the main memory to cause the application module to perform operational steps. The operational steps comprise:

(a) defining a set of wellbore conditions for the wellbore location;
(b) defining plug properties based on the physical properties and composition of a proposed plug;
(c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat;
(d) determining whether the dissolution properties meet the needs of a wellbore operation;
(e) repeating at least a portion of steps (a) or (d) for either differing plug properties or a differing set of wellbore conditions; and
(f) selecting a plug and wellbore conditions for the plug to use at the well location for the wellbore operation based on steps (a) through (e).

In accordance with the above disclosure, the set of wellbore conditions can include one, more than one or all of the physical properties of a plug seat, and temperature, pressure, pH of wellbore fluid, and salinity of wellbore fluid at the wellbore location. Further, the set of wellbore conditions can account for variations in the wellbore conditions over a period of time when the proposed plug is at the wellbore location. Also, the physical and chemical model includes stress-deformation for the proposed plug.

The system as indicated can determine which plug meets the requirements of the well operation under the set of wellbore conditions; which wellbore conditions enable the plug to meet the requirements of the well operation; or determine which plug and wellbore condition combination best meet the requirements of the well operation. For example, in one embodiment, step (e) of the process repeats steps (b) through (d) for differing plug properties of one or more additional proposed plugs until at least one proposed plug is determined to have a dissolution time that meets the needs of the wellbore operation under the set of wellbore conditions.

For example, in another embodiment, step (e) of the process repeats steps (a), (c) and (d) for differing sets of wellbore conditions so as to determine wellbore conditions for which the proposed plug has a dissolution time that meets the needs of the wellbore operation.

The above method, its steps and systems incorporating the method can be better understood by the following example, which illustrates the process as carried out for a well.

Example

An experimental study was performed to examine the dissolution kinetics of magnesium alloy balls as a function of ball size, temperature, salt species and salt concentration in order to determine if a model could be developed to select suitable ball plugs for downhole operations.

The magnesium balls comprised two different magnesium formulations (DM 200 and DM LT), each formulation was tested in a ball size of 1.72-inch diameter and 4.156-inch diameter. The balls were tested at 140° F. and 180° F. NaCl and KCl salt species were used for the test. The dissolution tests were characterized by weight and diameter measurements to provide data for the design of a kinetic model to predict the dissolution kinetics as a function of the mentioned parameters.

While not wishing to be bound by theory, it is believed that the magnesium alloy balls dissolved in water based on the following electro-chemical reactions.

$$Mg(s) \rightarrow Mg^{++} + 2e^- \qquad \text{Anode:}$$

$$4H_2O \rightarrow 2H_3O^+ + 2(OH)^- \qquad \text{Cathode:}$$

$$Mg^{++} + 2OH^- \rightarrow Mg(OH)_2(s) \qquad \text{Anode:}$$

$$2H_3O^+ + 2e^- \rightarrow H_2(g) \qquad \text{Cathode:}$$

$$Mg(s) + 2H_2O(l) \rightarrow Mg(OH)_2(s) + H_2(g)$$

The balls were tested for dissolution in accordance with Table 1.

TABLE 1

| Experiment Number | Type of Ball | Temperature (° F.) | Ball Size (inches) | Salt |
|---|---|---|---|---|
| 1 | DM 200 | 180 | 4.156 | 0.0416% wt NaCl |
| 2 | DM LT | 180 | 1.720 | 0.0416% wt NaCl |
| 3 | DM LT | 140 | 4.156 | 0.0416% wt NaCl |
| 4 | DM 200 | 140 | 1.720 | 0.0416% wt NaCl |
| 5 | DM LT | 140 | 4.156 | 6.67% wt NaCl |
| 6 | DM 200 | 140 | 1.720 | 1% wt KCl |
| 7 | DM 200 | 180 | 1.720 | 6.67% wt NaCl |
| 8 | DM LT | 180 | 4.156 | 1% wt KCl |
| 9 | DM LT | 180 | 1.720 | 1.67% wt NaCl |
| 10 | DM 200 | 140 | 4.156 | 1.67% wt NaCl |
| 11 | DM LT | 140 | 1.720 | 6.67% wt NaCl |

The tests were conducted to determine the length of time it would take before the dissolution of the ball would result in an end of test ball diameter that would allow the remaining ball to be pumped through a ball seat. For the 4.156 inch diameter ball, the maximum end of test diameter was 3.50 inches, with a minimum weight loss of 38%; and for the 1.720 inch diameter ball the maximum end of test diameter was 1.47 inches, with a minimum weight loss of 40%.

Figure 5:
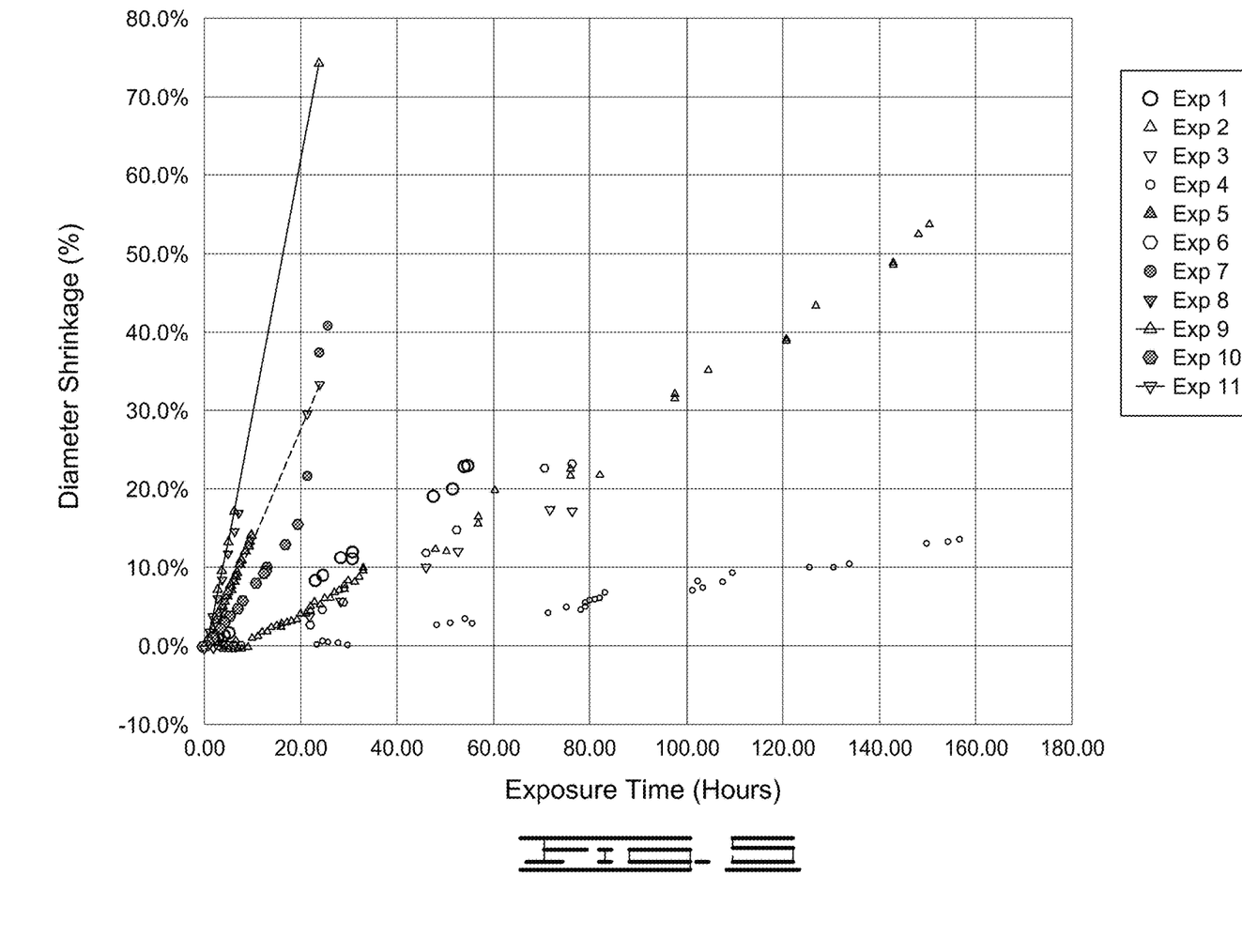
FIG. 5 is a graph of exposure time vs. diameter shrinkage for various plugs and well conditions as discussed in the Example.
Figure 6:
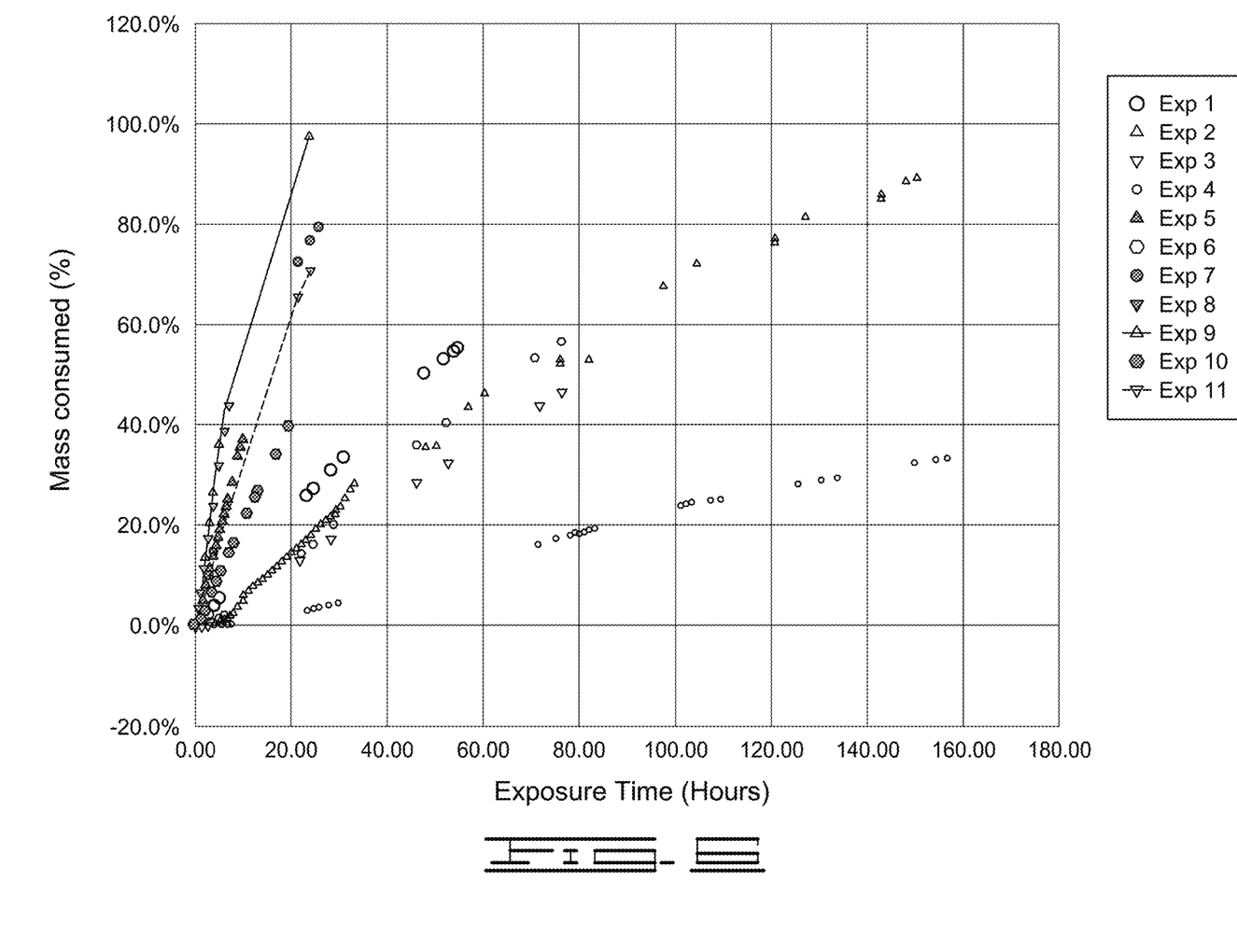
FIG. 6 is a graph of exposure time vs. mass consumed for various plugs and well conditions as discussed in the Example.

The results of the test are illustrated in FIGS. 5 and 6. From these results, a kinetic model was developed. In developing the kinetic model, it was assumed that the ball has abundant access to the surrounding media (water or salt water) it needs for the reaction to proceed unhindered, and the product of dissolution precipitates out and is inert. Further, it was assumed that all the reaction happens on the surface of the ball since the ball material is non-porous.

Assuming the total amount of reaction leading to mass loss is directly proportional to the surface area of the ball, then the mass reduction is governed by the formula:

$$\frac{dM(t)}{dt} = -4\pi r(t)^2 \cdot \rho_b \cdot K$$

Where, M is the mass of the ball, r is the radius of the ball and $\rho_b$ is the density of the ball. K is the reaction rate constant in units of length/time. The negative sign indicates that the mass of the ball reduces as the reaction proceeds.

Using the fact that:

$$M = \frac{4}{3}\pi r^3 \rho_b$$

The above equation can be written as:

$$\frac{dr(t)}{dt} = -K$$

Or, the radius of the ball reduces at a constant rate under given conditions. Note that the value of K depends on the ball type, temperature, pressure, and amount and type of salt in the solution.

The above equation may be integrated and using the relation between mass and radius, it may be written as:

$$\left(1 - X(t)^{\frac{1}{3}}\right) = t\frac{K}{R_0}$$

Where, $R_0$ is the initial ball size and $$X(t) = \frac{\text{Mass of the ball }(t)}{\text{Initial mass of the ball}}$$

is the mass fraction of the ball remaining. The above equations indicate that for a given ball and conditions of reaction, there is a linear relationship between time of reaction and $$(1-X(t)^{1/2})$$

With the slope equal to $K/R_0$.

The experimental data showed the existence of an induction period (I) in the beginning, during which the ball loses negligible mass. The experimental data indicated that the induction period is caused by the surface finish of the balls. Presumably, it takes some time for the surface morphology to evolve from the smooth metallic surface at the start to the "moon-rock" type rugged structure with increased reactive surface area, which was observed later in the experiments. The reaction can proceed at a steady state on the later rugged-structure surface. Also, it was noticed that the corrosion of the surface to the rugged-structure surface proceeds faster in higher salinity, corresponding with a reduced induction time.

Figure 7:
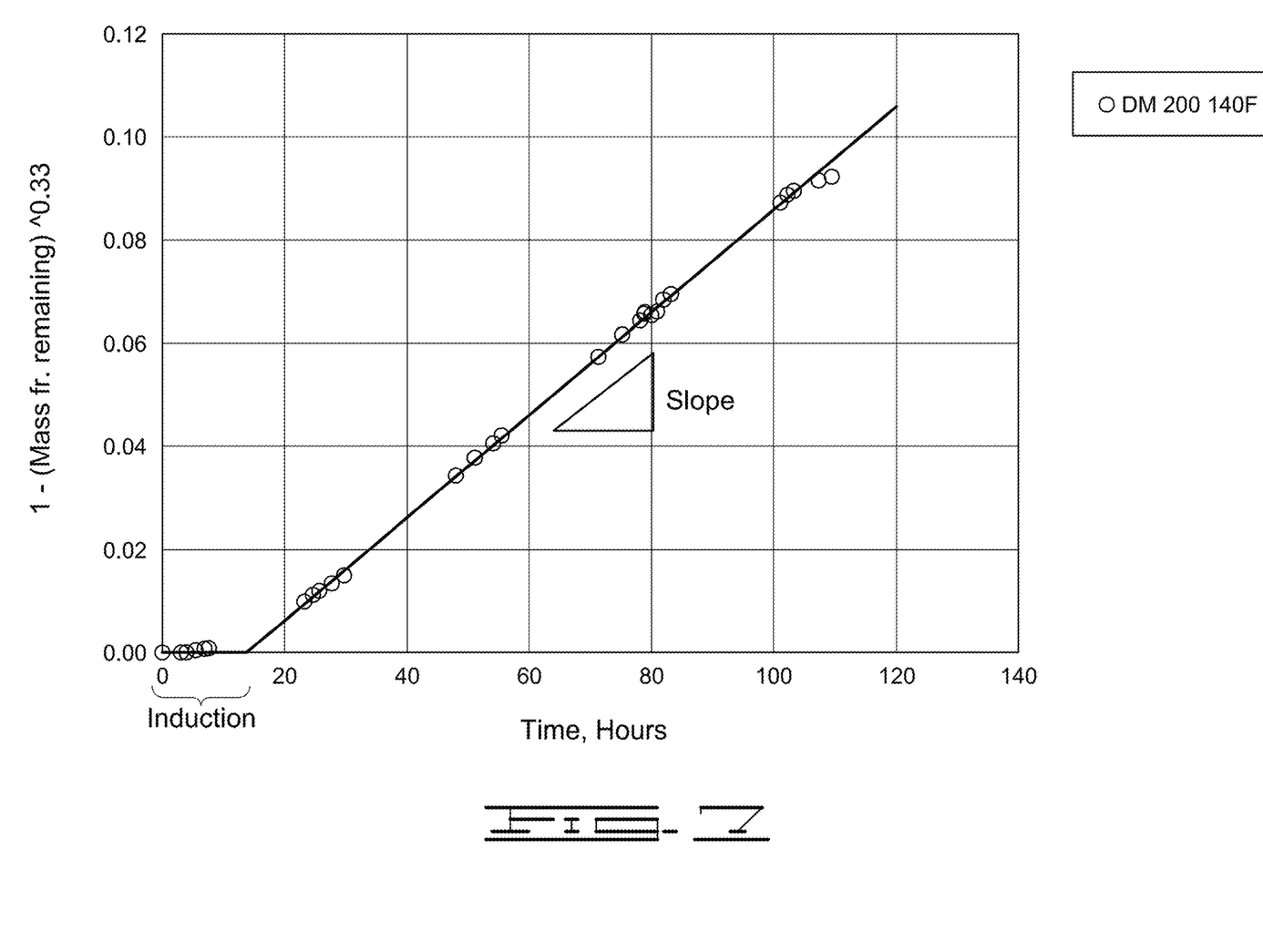
FIG. 7 of a graph of time vs. (1−mass remaining) for a DM 200 ball plug as further discussed in the Example.

Consistent with the above, FIG. 7 shows the experimental data for a 1.72-inch diameter DM 200 ball in fresh water (250 ppm salt) kept at 140° F. As expected from the above analysis, the data clearly shows the linear relationship. In addition, the data also shows an induction period (after about 14 hours) where the ball loses negligible mass.

Tables 2 and 3 summarize the results of the experimental test used to develop the model. Table 2 summarizes the above-described experiments on DM 200 and DM LT balls. Table 3 summarizes additional experimental work on DM 200 balls used to develop a model.

TABLE 2

| Ext # | Type of Ball | Temp. (° F.) | Ball Size (inches) | Salt Conc. (wt %) | Salt Type | Slope (1/hr) | Induction (hr) |
|---|---|---|---|---|---|---|---|
| 1 | DM 200 | 180 | 4.156 | 0.0416 | NaCl | 0.0044 | 1.27 |
| 2 | DM LT | 180 | 1.72 | 0.0416 | NaCl | 0.0035 | 5.11 |
| 3 | DM LT | 140 | 4.156 | 0.0416 | NaCl | 0.0026 | 3.73 |
| 4 | DM 200 | 140 | 1.72 | 0.0416 | NaCl | 0.0010 | 13.71 |
| 5 | DM LT | 140 | 4.156 | 6.67 | NaCl | 0.0150 | 0.28 |
| 6 | DM 200 | 140 | 1.72 | 1 | KCl | 0.0033 | 5.26 |
| 7 | DM 200 | 180 | 1.72 | 6.67 | NaCl | 0.0167 | 0.58 |
| 8 | DM LT | 180 | 4.156 | 1 | KCl | 0.0253 | 0.12 |
| 9 | DM LT | 180 | 1.72 | 1.67 | NaCl | 0.0306 | 0.45 |
| 10 | DM 200 | 140 | 4.156 | 1.67 | NaCl | 0.0081 | 0.67 |
| 11 | DM LT | 140 | 1.72 | 6.67 | NaCl | 0.0146 | 0.65 |

TABLE 3

| Data # | Type of Ball | Temp. (° F.) | Ball Size (inches) | Salt Conc. (wt %) | Salt Type | Pressure (PSI) | Slope (1/hr) | Induction (hr) |
|---|---|---|---|---|---|---|---|---|
| D1 | DM 200 | 150 | 4.156 | 0 |  | 5000 | 0.0015 | 13.42 |
| D2 | DM 200 | 190 | 2 | 0 |  | 5000 | 0.0044 | 11.09 |
| D3 | DM 200 | 200 | 4.156 | 0 |  | 5000 | 0.0035 | 4.64 |
| D4 | DM 200 | 190 | 2 | 1 | KCl | 5000 | 0.0076 | 2.11 |
| D5 | DM 200 | 190 | 2 | 2 | KCl | 5000 | 0.0101 | 0.14 |

Using the above data, the following models were developed for induction time as well as the slope.

$$I = I_0[\text{Ball type}] \cdot \exp\left(-\frac{E_I}{T}\right) \cdot (R_0)^\wedge \alpha \cdot$$
$$\exp(V_I \cdot P) \cdot \exp(S_{0I}[\text{Salt Type}] \text{erf}(S_{1I}[\text{Salt Type}] \cdot C_s))$$

Where:
- $I_0$ is a constant which depends on the ball type
- $E_I$ is the activation energy
- $\alpha$ is the exponent on the initial ball size
- $V_I$ is the constant capturing pressure effect
- $S_{0I}$ and $S_{1I}$ are two constants which depend on the type of salt used
- Function erf( ) is a standard error function
- $C_s$ is the salt concentration in the medium Similarly, $$\text{slope} = K/R_0 =$$
$$K_0[\text{Ball type}] \cdot \exp\left(-\frac{E_k}{T}\right) \cdot (R_0)^\wedge \beta \cdot \exp(V_k \cdot P) \cdot \exp(S_{0k} \cdot \text{erf}(S_{1k} \cdot C_s))$$

where
- $K_0$ is a constant dependent on the ball type,
- $E_k$ is the activation energy,
- $\beta$ is the exponent on the ball size,
- $V_k$ is the constant capturing pressure effect
- $S_{0k}$ and $S_{1k}$ are two constants which control the effect of the amount of salt.

Note that the effect of salt type on the slope is not yet captured. Also, $V_k$ is currently set to zero as the current data was not sufficient to describe effect of pressure on slope completely.

Figure 8:
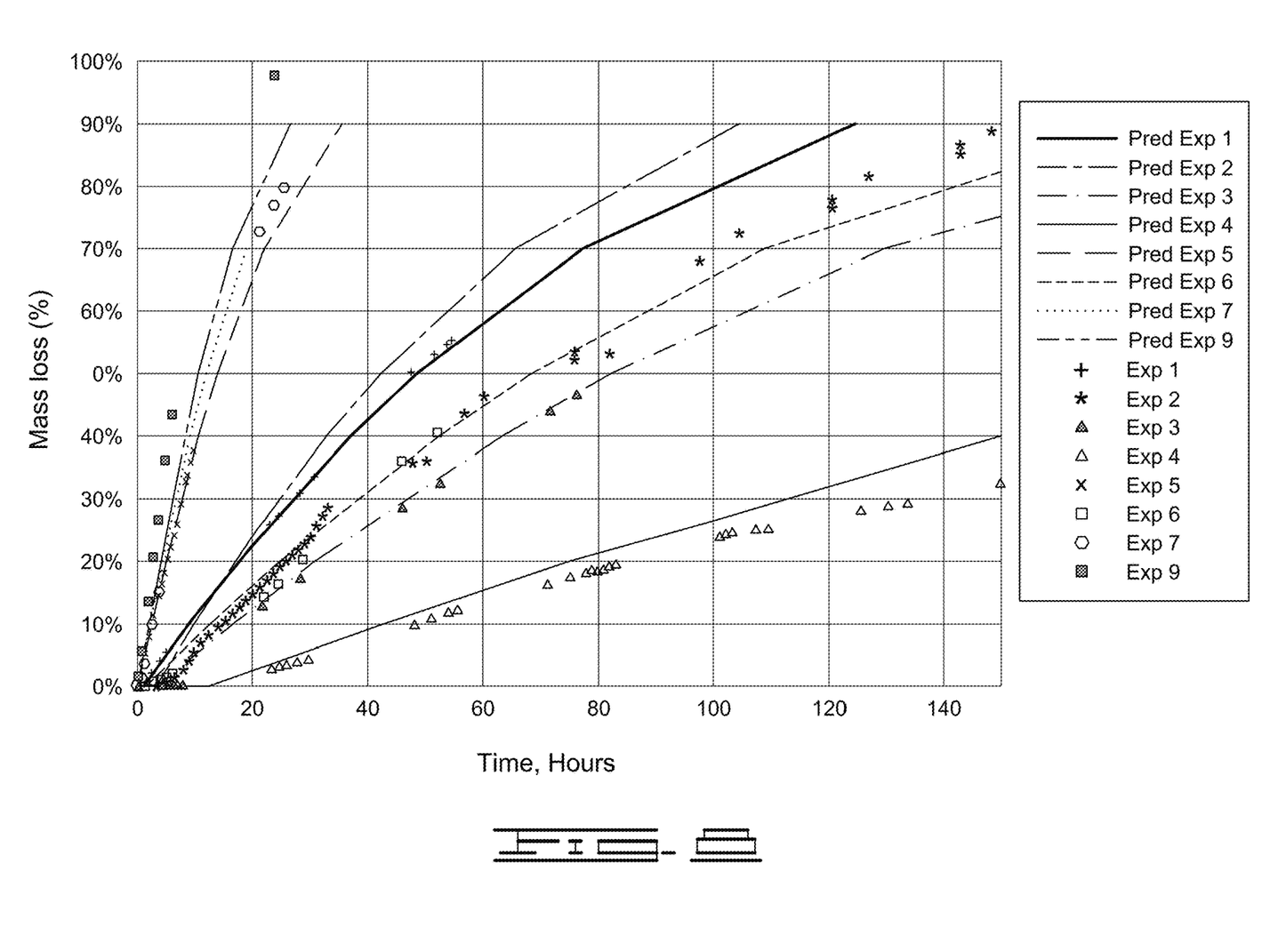
FIG. 8 is a graph of time vs. mass loss percent for various plugs and well conditions as further discussed in the Example.

The above models were used to generate predicted mass loss as a function of time. This predicted mass loss is overlaid on the experimental data in FIG. 8. In the FIG. 8 legend, the mass loss predicted by the model are listed as "Pred. Exp. #" and the experimental data is listed as "Exp. #" As can be seen from FIG. 8, there is generally good agreement between the predicted dissolution and the actual dissolution. The instant with less agreement was likely due to insufficient temperature control during the experiment. Accordingly, this Example illustrates that a model prediction of the induction period and the dissolution kinetics of dissolvable plugs can be created, delivery of a satisfactory match with experimental data.

The above disclosure, and embodiments thereunder, are exemplified by methods and systems defined by the following numbered paragraphs.

1. A method of selecting well plugs and/or wellbore conditions for use at a wellbore location, the method comprising:
    (a) defining set of wellbore conditions for the wellbore location;
    (b) defining plug properties which include dissolution time properties;
    (c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat;
    (d) determining whether the dissolution properties meet the needs of a wellbore operation; and
    (e) selecting a plug and wellbore conditions for the plug to use at the well location for the wellbore operation based on steps (a) through (d).
2. The method of paragraph 1, wherein the set of wellbore conditions include one or more of physical properties of a plug seat, temperature, pressure, pH of wellbore fluid, and salinity of wellbore fluid at the wellbore location.
3. The method of paragraph 2, wherein the set of wellbore conditions include all the following: physical properties of a plug seat, temperature, pressure, pH of wellbore fluid, and salinity of wellbore fluid at the wellbore location.
4. The method of either paragraphs 2 or 3, wherein the set of wellbore conditions account for variations in the wellbore conditions over a period of time when the proposed plug is at the wellbore location.
5. The method of any of paragraphs 1 to 4, wherein the plug properties are based on the physical properties and composition of a proposed plug, and optionally, the physical and chemical model includes stress-deformation for the proposed plug.
6. The method of any of claims 1 to 5, further comprising repeating at least a portion of steps (a) through (d) for either differing plug properties or a differing set of wellbore conditions.
7. The method of paragraph 6, wherein the process repeats steps (b) through (d) for differing plug properties of one or more additional proposed plugs until at least one proposed plug is determined to have a dissolution time that meets the needs of the wellbore operation under the set of wellbore conditions.
8. The method of paragraph 6, wherein the process repeats steps (a), (c) and (d) for differing sets of wellbore conditions so as to determine wellbore conditions for which the proposed plug has a dissolution time that meets the needs of the wellbore operation.
9. The method of any of paragraphs 1 to 8, further comprising using the selected plug in the wellbore in the wellbore operation.

10. The method of any of paragraphs 1 to 8, further comprising testing a plug selected in step (f) under laboratory conditions and thereafter using the selected plug in the wellbore in the wellbore operation.

11. The method of any of paragraphs 1 to 10, wherein the plug comprises a magnesium alloy.

12. A method of selecting well plugs and wellbore conditions for use at a wellbore location, the method comprising:
(a) defining a set of wellbore conditions for the wellbore location, the set of wellbore conditions include one or more of physical properties of a plug seat, temperature, pressure, pH of wellbore fluid, and salinity of wellbore fluid at the wellbore location, and the set of wellbore conditions account for variations in the wellbore conditions over a period of time when the proposed plug is at the wellbore location;
(b) defining plug properties which include dissolution time properties based on the physical properties and composition of a proposed plug, wherein the proposed plug is composed of a magnesium alloy; and
(c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat, and wherein the physical and chemical model includes stress-deformation for the proposed plug testing plug;
(d) determining whether the dissolution properties meet the needs of a wellbore operation;
(e) repeating at least a portion of steps (a) or (d) for either differing plug properties or a differing set of wellbore conditions;
(f) selecting a plug and wellbore conditions for the plug to use at the well location for the wellbore operation based on steps (a) through (e);
(g) testing a plug selected in step (f) under laboratory conditions; and
(h) after step (g) using the selected plug in the wellbore in the wellbore operation.

13. A method of selecting well plugs and wellbore conditions for use at a wellbore location, the method comprising:
(a) defining a set of wellbore conditions for the wellbore location, the set of wellbore conditions include all the following: physical properties of a plug seat, temperature, pressure, pH of wellbore fluid, and salinity of wellbore fluid at the wellbore location, and the set of wellbore conditions account for variations in the wellbore conditions over a period of time when the proposed plug is at the wellbore location;
(b) defining plug properties which include dissolution time properties based on the physical properties and composition of a proposed plug, wherein the proposed plug is composed of a magnesium alloy;
(c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat, and wherein the physical and chemical model includes stress-deformation for the proposed plug testing plug;
(d) determining whether the dissolution properties meet the needs of a wellbore operation;
(e) repeating at least a portion of steps (a) or (d) for either differing plug properties or a differing set of wellbore conditions;
(f) selecting a plug and wellbore conditions for the plug to use at the well location for the wellbore operation based on steps (a) through (e);
(g) testing a plug selected in step (f) under laboratory conditions; and
(h) after step (g) using the selected plug in the wellbore in the wellbore operation.

14. The method of either paragraph 12 or 13, wherein in step (e), the process repeats steps (b) through (d) for differing plug properties of one or more additional proposed plugs until at least one proposed plug is determined to have a dissolution time that meets the needs of the wellbore operation under the set of wellbore conditions.

15. The method of either paragraph 12 or 13, wherein in step (e), the process repeats steps (a), (c) and (d) for differing sets of wellbore conditions so as to determine wellbore conditions for which the proposed plug has a dissolution time that meets the needs of the wellbore operation.

16. A system for selecting well plugs and/or wellbore conditions, the system comprising:
a main memory configured to store computer readable code for an application module; and
at least one processor coupled to the main memory, said at least one processor executing the computer readable code in the main memory to cause the application module to perform operational steps of:
(a) defining a set of wellbore conditions for the wellbore location;
(b) defining plug properties which include dissolution time properties based on the physical properties and composition of a proposed plug;
(c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat;
(d) determining whether the dissolution properties meet the needs of a wellbore operation; and
(e) selecting a plug and wellbore conditions for the plug to use at the well location for the wellbore operation based on steps (a) through (d).

17. The system of paragraph 16, wherein the set of wellbore conditions include one or more of physical properties of a plug seat, temperature, pressure, pH of wellbore fluid, and salinity of wellbore fluid at the wellbore location.

18. The system of paragraph 17, wherein the set of wellbore conditions include all the following: physical properties of a plug seat, temperature, pressure, pH of wellbore fluid, and salinity of wellbore fluid at the wellbore location.

19. The system of either paragraph 17 or 18, wherein the set of wellbore conditions account for variations in the wellbore conditions over a period of time when the proposed plug is at the wellbore location.

20. The system of any of paragraphs 16 to 19, wherein the physical and chemical model includes stress-deformation for the proposed plug.

21. The system of any of paragraphs 16 through 20, wherein the operational steps further comprise repeating at least a portion of steps (a) through (d) for either differing plug properties or a differing set of wellbore conditions.

22. The system of paragraph 21, wherein the process repeats steps (b) through (d) for differing plug properties of one or more additional proposed plugs until at least one proposed plug is determined to have a dissolution time that meets the needs of the wellbore operation under the set of wellbore conditions.

23. The system of paragraph 21, wherein the process repeats steps (a), (c) and (d) for differing sets of wellbore conditions so as to determine wellbore conditions for which the proposed plug has a dissolution time that meets the needs of the wellbore operation.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to be the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of selecting well plugs and/or wellbore conditions for use at a wellbore location, the method comprising:
   (a) defining a set of wellbore conditions for the wellbore location;
   (b) defining plug properties which include dissolution time properties;
   (c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat;
   (d) determining whether the dissolution properties meet the needs of a wellbore operation; and
   (e) selecting a plug and wellbore conditions for the plug to use at the well location for the wellbore operation based on steps (a) through (d).

2. The method of claim 1, wherein the set of wellbore conditions include one or more of physical properties of a plug seat, temperature, pressure, pH of wellbore fluid, and salinity of wellbore fluid at the wellbore location.

3. The method of claim 2, wherein the set of wellbore conditions include all the following: physical properties of a plug seat, temperature, pressure, pH of wellbore fluid, and salinity of wellbore fluid at the wellbore location.

4. The method of claim 2, wherein the set of wellbore conditions account for variations in the wellbore conditions over a period of time when the proposed plug is at the wellbore location.

5. The method of claim 1, wherein the physical and chemical model includes stress-deformation for the proposed plug.

6. The method of claim 1, further comprising repeating at least a portion of steps (a) through (d) for either differing plug properties or a differing set of wellbore conditions.

7. The method of claim 6, wherein the process repeats steps (b) through (d) for differing plug properties of one or more additional proposed plugs until at least one proposed plug is determined to have a dissolution time that meets the needs of the wellbore operation under the set of wellbore conditions.

8. The method of claim 6, wherein the process repeats steps (a), (c) and (d) for differing sets of wellbore conditions so as to determine wellbore conditions for which the proposed plug has a dissolution time that meets the needs of the wellbore operation.

9. The method of claim 1, further comprising using the selected plug in the wellbore in the wellbore operation.

10. The method of claim 1, further comprising testing plug selected in step (f) under laboratory conditions and thereafter using the selected plug in the wellbore in the wellbore operation.

11. The method of claim 1, wherein the plug comprises a magnesium alloy.

12. The method of claim 11, wherein the process repeats steps (b) through (d) for differing plug properties of one or more additional proposed plugs until at least one proposed plug is determined to have a dissolution time that meets the needs of the wellbore operation under the conditions of the set of wellbore conditions.

13. The method of claim 11, wherein the process repeats steps (a), (c) and (d) for differing sets of wellbore conditions so as to determine wellbore conditions for which the proposed plug has a dissolution time that meets the needs of the wellbore operation.

14. The method of claim 1, wherein:
   the set of wellbore conditions include one or more of physical properties of a plug seat, temperature, pressure, pH of wellbore fluid, and salinity of wellbore fluid at the wellbore location, and the set of wellbore conditions account for variations in the wellbore conditions over a period of time when the proposed plug is at the wellbore location;
   the plug comprises a magnesium alloy;
   the physical and chemical model includes stress-deformation for the proposed plug; and the method further comprises:

testing plug selected in step (f) under laboratory conditions and thereafter using the selected plug in the wellbore in the wellbore operation.

15. A system for selecting well plugs and/or wellbore conditions, the system comprising:

a main memory configured to store computer readable code for an application module; and at least one processor coupled to the main memory, said at least one processor executing the computer readable code in the main memory to cause the application module to perform operational steps of:
  (a) defining a set of wellbore conditions for the wellbore location;
  (b) defining plug properties based on the physical properties and composition of a proposed plug;
  (c) creating an analysis of a physical and chemical model generated from the set of wellbore conditions and plug properties to determine dissolution properties for the proposed plug at the wellbore location, wherein the dissolution properties include at least one of the seal times for which the proposed plug can maintain a seal with the plug seat to hold pressure and the dissolution time until the plug is dissolved sufficiently to pass through the plug seat;
  (d) determining whether the dissolution properties meet the needs of a wellbore operation; and
  (e) selecting a plug and wellbore conditions for the plug to use at the well location for the wellbore operation based on steps (a) through (d).

16. The system of claim 15, wherein the set of wellbore conditions include one or more of physical properties of a plug seat, temperature, pressure, pH of wellbore fluid, and salinity of wellbore fluid at the wellbore location.

17. The system of claim 16, wherein the set of wellbore conditions include all the following: physical properties of a plug seat, temperature, pressure, pH of wellbore fluid, and salinity of wellbore fluid at the wellbore location.

18. The system of claim 16, wherein the set of wellbore conditions account for variations in the wellbore conditions over a period of time when the proposed plug is at the wellbore location.

19. The system of claim 15, wherein the process repeats steps (b) through (d) for differing plug properties of one or more additional proposed plugs until at least one proposed plug is determined to have a dissolution time that meets the needs of the wellbore operation under the set of wellbore conditions.

20. The system of claim 15, wherein the process repeats steps (a), (c) and (d) for differing sets of wellbore conditions so as to determine wellbore conditions for which the proposed plug has a dissolution time that meets the needs of the wellbore operation.

* * * * *